United States Patent
Liou et al.

(10) Patent No.: US 8,179,496 B2
(45) Date of Patent: May 15, 2012

(54) DISPLAY CASING CAPABLE OF ACCOMMODATING LCD PANEL MODULES OF DIFFERENT SIZES

(75) Inventors: Guan-De Liou, Taipei (TW); Wen-Hung Huang, Tucheng (TW); Stephen Tsai, Sijhih (TW); Shao-Yu Hwang, Taipei (TW)

(73) Assignee: Hannspree, Inc., Taipei (TW)

( * ) Notice: Subject to any disclaimer, the term of this patent is extended or adjusted under 35 U.S.C. 154(b) by 281 days.

(21) Appl. No.: 12/461,974

(22) Filed: Aug. 31, 2009

(65) Prior Publication Data
US 2010/0321606 A1    Dec. 23, 2010

(30) Foreign Application Priority Data
Jun. 22, 2009 (TW) ................................ 98120778 A

(51) Int. Cl.
*G02F 1/1333* (2006.01)
(52) U.S. Cl. .......................................... 349/58; 349/60
(58) Field of Classification Search ............. 349/58–60; 206/320, 454, 775–777
See application file for complete search history.

(56) References Cited

U.S. PATENT DOCUMENTS
2006/0066769 A1*    3/2006    Minaguchi et al. .............. 349/58
* cited by examiner

*Primary Examiner* — Mark Robinson
*Assistant Examiner* — Charles Chang
(74) *Attorney, Agent, or Firm* — Bacon & Thomas, PLLC

(57) ABSTRACT

A display casing includes a front casing, a rear casing and adjusting portions, wherein the front casing is engaged with the rear casing, the rear casing has first positioning portions disposed on its internal side, and each adjusting portion has a support stand coupled to the corresponding first positioning portion and an elastic plate fixed onto a lateral side of the support stand. When the adjusting portions are connected to the corresponding first positioning portions, the elastic plates form an enclosed accommodating area for accommodating and positioning a LCD panel module, and a hole disposed at the center of the front casing is provided for aligning a display surface of the LCD panel module, such that manufacturers can adjust positions of the adjusting portions to change the size of the accommodating area for accommodating LCD panel modules of different sizes.

2 Claims, 5 Drawing Sheets

DISPLAY CASING CAPABLE OF ACCOMMODATING LCD PANEL MODULES OF DIFFERENT SIZES

FIELD OF THE INVENTION

The present invention relates to an LCD display casing, more particularly to a rear casing having a plurality of first positioning portions disposed in the rear casing and a plurality of adjusting portions embedded into the first positioning portions to form an accommodating area, such that manufacturers can install different size LCD panel modules into the display casing by simply adjusting positions of the adjusting portions.

BACKGROUND OF THE INVENTION

Conventional display device (such as televisions, monitor, and the like) primarily use cathode ray tube (CRT) to achieve an image displaying effect, however, the CRT display has the problems of having a bulky size, a heavy weight, and a high power consumption. Nowadays, as the high-tech industry advances, conventional display devices adopting CRT are gradually replaced by liquid crystal display (LCD) panels, since the designs of LCD panel products (such as televisions, monitors, notebook computers, and the like) are thinner, lighter, shorter and more compact. The designs of LCD products not only allow users to move the LCD products more easily, but also require less space for placing the LCD products and increase usable spaces effectively. As a result, the LCD products become favorable products for individual and corporate users in recent years, and they are used extensively in our daily life and work.

In general, manufacturers of LCD products uses different size LCD panel modules from smallsize panels to large size panels regardless of the brand of the LCD products, so that the manufactured LCD products can cover all kinds of product specifications. Therefore, before manufacturing the LCD products, the manufacturers required to design and manufacture different size and specification of display casings according to the LCD panel modules to fit a variety of different specifications and hold each LCD panel module into a corresponding display casing securely. Besides that, the manufacturers also have to set up different production lines for manufacturing different specifications of LCD products, such that all different size LCD panel module can be assembled in every production line to meet a market demand. However, if the market demand for one specific type of LCD products with a specific size increases drastically, and the market demand for another type of LCD products with another size decreases drastically, then the manufacturers have to increase the number of production lines for the specific size in demand and reduce or change the production lines for the other size not in demand. Obviously, this arrangement incurs a higher level of complexity for production management, and may cause a delay in production schedule and a significant increase of production cost. Since the manufacture of LCD products of different sizes generally fluctuates with the market demand, therefore manufacturers have to forecast and prepare certain quantity of display casings for a particular sized LCD panel module in order to meet the market demand. If a manufacturer has overestimated the demand for one type of LCD product of a particular size during the production process, then a huge inventory will occur, not only requiring a large amount of capital, but also incurring a high production cost of the LCD products.

For instance, the 15-inch LCD TV demand in the market is less than the 17-inch LCD TV, and thus the dimension for the components or the size of the components in the 15-inch LCD TV are different from those of the 17-inch LCD TV, and manufacturers have to adjust a machine parameter or a robot arm control for the production lines according to the dimensions of different types of display casing, so as to assemble each component into a display casing of a predetermined dimension and secure each component into the display casing. The manufacturers have to make the aforementioned adjustments (including the adjustment of the machine parameter or the robot arm control) for the production lines every time when assembling display devices of different specifications according to each order, otherwise, the robot arm designed for producing a 15-inch LCD TV in a production line will be unable to align the locking position correctly for the machines in a production line set up for producing a 17-inch LCD TV. Obviously, a poor yield rate will result, and it is an important subject for display device manufacturers to design and develop a new display casing structure to overcome the aforementioned problems, and achieve the effects of facilitating the manufacture and minimizing the inventory of the manufactured display casings.

SUMMARY OF THE INVENTION

In view of the foregoing shortcomings of the conventional display casings, whose volumes vary with LCD panel modules of different dimensions, it is easy to realize that the prior art can incurs a huge inventory easily since a display casing cannot be used universally when installing the LCD panel modules of different sizes, and the manufacturers have to adjust the settings of the production lines in assembling processes to meet the assembling requirements and fit different specifications of the display casings. In addition, since the prior art not only increases the production cost, but also requires an inconvenient production procedure, the inventor of the present invention based on years of experience in the related industry to conduct extensive researches and experiments, and finally developed a display casing capable of accommodating LCD panel modules of different sizes in accordance with the present invention to overcome the shortcomings of the prior art.

Therefore, it is a primary objective of the present invention to provide a display casing capable of accommodating LCD panel modules of different sizes, such that components of the display casings can be used universally for display devices of different specifications in order to reduce any surplus components occurred in the production of the display casings. A display casing comprises a front casing, a rear casing and a plurality of adjusting portions, wherein the rear casing includes a plurality of first positioning portions disposed to the accommodating space, and the adjusting portions are connected to the corresponding first positioning portions and fixed onto the rear casing to form an enclosed accommodating area for accommodating an LCD panel module, and each adjusting portion is composed of a support stand and an elastic plate, and at least one second positioning portion is extended from one end of each support stand and connected to a corresponding first positioning portion, and each elastic plate has a cross-section substantially in a curved shape and fixed onto a lateral side of the support stand facing the accommodating area, such that each elastic plate abuts against an edge of the LCD panel module to position the LCD panel module in the accommodating area. In addition, a hole is formed at the center of the front casing and disposed at a position and having a size corresponding to a display surface of the LCD panel module, such that users can view an image displayed on the display surface through the hole, so that manufacturers can change the size of the accommodating area by simply adjusting the positions of the adjusting portions, in order to accommodate an LCD panel module of a specific size into the accommodating area, and manufacturers can produce standardized front casings, rear casings and adjusting portions. Since manufacturers only need to change the LCD panel modules with different specifications according to the hole of the front casing during the production of different size display devices, and keep the size of the front and rear casings unchanged, therefore manufacturers can adjust machine parameters and robot arm control in the production lines conveniently, without adjusting the settings for the display casings of different dimensions as required in the prior art, so as to reduce the complexity of production management and enhance the market competitiveness effectively.

DETAILED DESCRIPTION OF THE PREFERRED EMBODIMENTS

Figure 1:
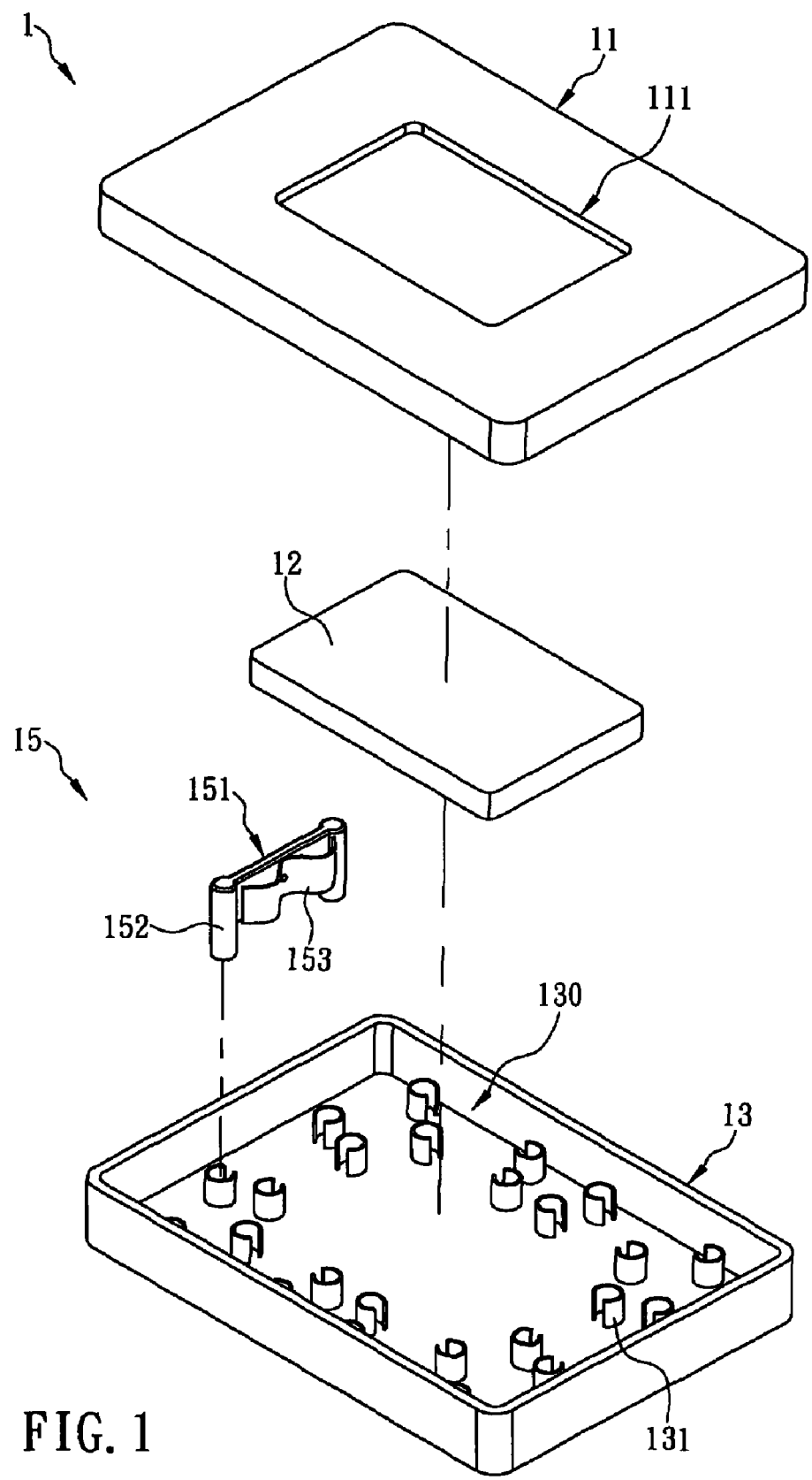
FIG. 1 is an exploded view of a first preferred embodiment of the present invention.
Figure 2:
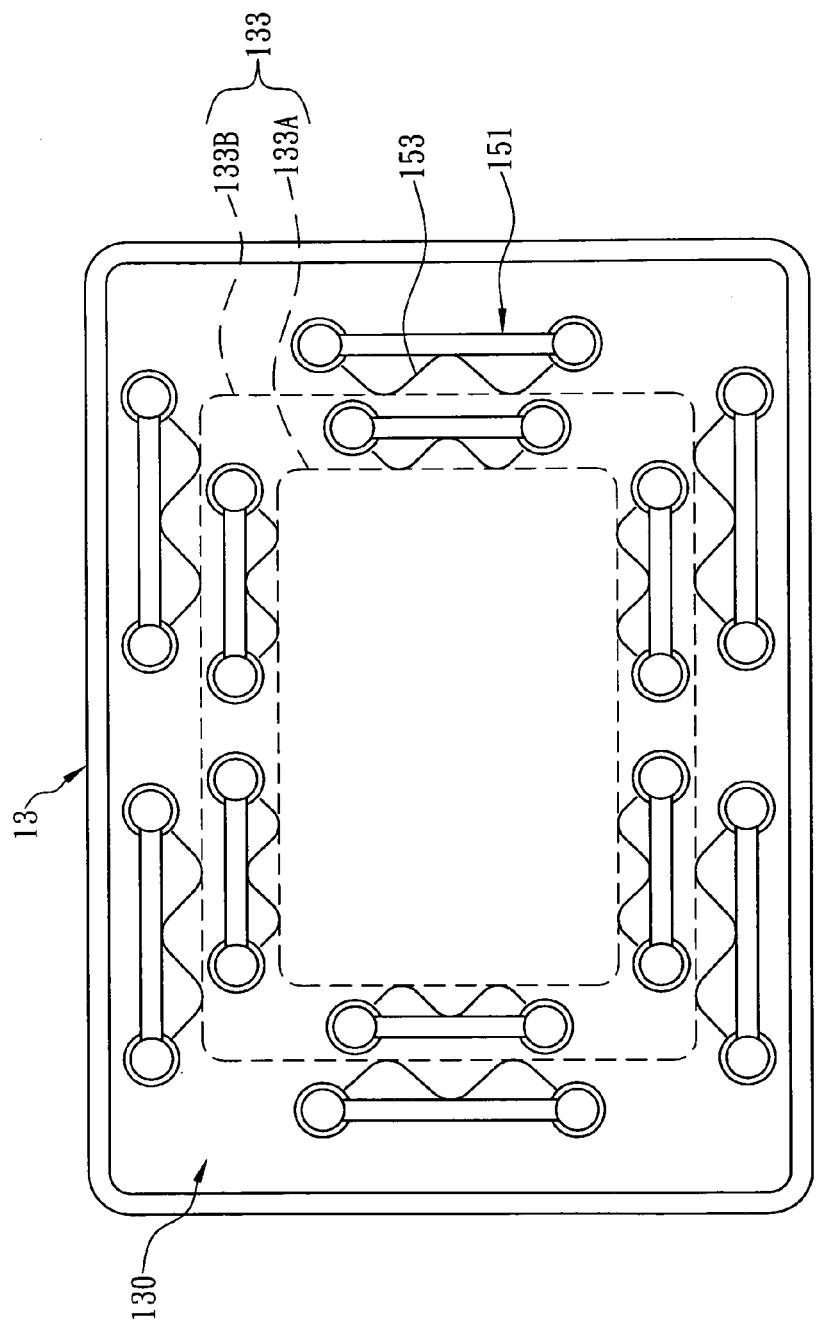
FIG. 2 is a schematic view of a rear casing of the present invention.

The present invention relates to a display casing capable of accommodating LCD panel modules of different sizes, and installing one of different sized LCD panel modules into the same size of the display casing, such that the display casing can be utilized sufficiently and effectively, and manufacturers can avoid a huge inventory of display casings of a specific size due to a change of market demands for the displays of that particular size and facilitate the production of related components for the standardized display casings. With reference to FIGS. 1 and 2, a display casing 1 of the invention comprises a front casing 11, a rear casing 13 and a plurality of adjusting portions 15, wherein the front casing 11 and the rear casing 13 are engaged and fixed with one another, and the rear casing 13 includes a plurality of first positioning portions 131 disposed on an internal side of the rear casing 13, and the adjusting portions 15 are fixed into the first positioning portions 131 and forced to form an enclosed accommodating area 133 for accommodating an LCD panel module 12 into the accommodating area 133. If an assembling operator adjusts positions of the adjusting portions 15, the size of the accommodating area 133 will be changed (such as a change from the accommodating area 133A to the accommodating area 133B), so that manufacturers can adjust the adjusting portions 15 according to the production requirements to position a specific size LCD panel module 12 inside the accommodating area 133 and install the LCD panel module 12 into the rear casing 13. In addition, the front casing 11 has a hole 111 disposed at the center of the front casing 11 and the size of the hole 111 varies with the size of a display panel of an LCD panel module 12. If a manufacturer assembles a smaller LCD panel module 12 (such as the LCD panel module 12 accommodated inside the accommodating area 133A), the hole 111 of the front casing 11 has an area matched with the accommodating area 133A to shield other unused first positioning portions 131. If the manufacturer assembles a larger LCD panel module 12 (such as the LCD panel module 12 accommodated inside the accommodating area 133B), the hole 111 of the front casing 11 has an area matched with the accommodating area 133B, and allow users to view an image displayed on a display surface of the LCD panel module 12 through the hole 111.

Figure 3:
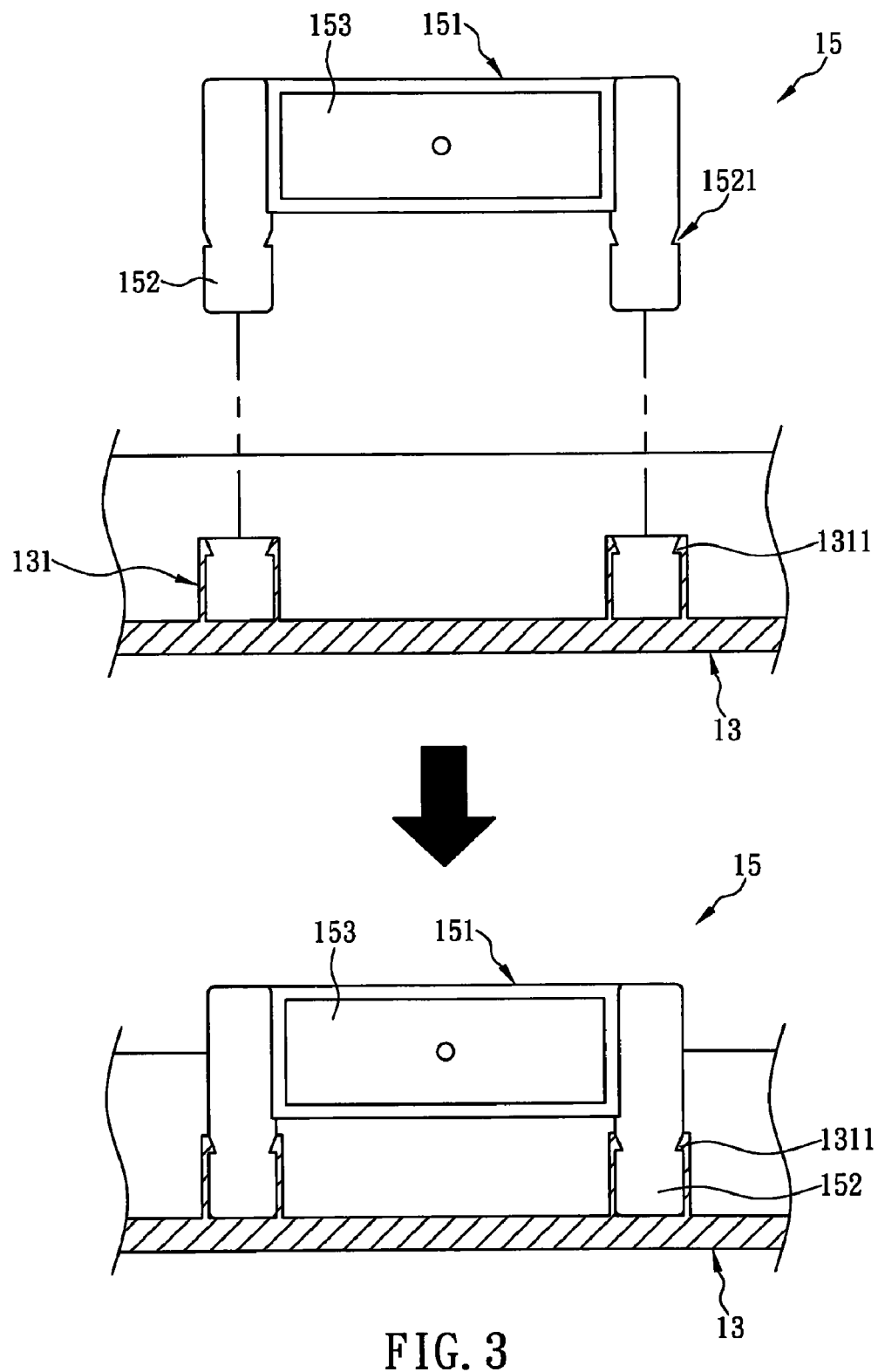
FIG. 3 is a schematic view showing a connection of an adjusting portion with a rear casing of the first preferred embodiment of the present invention.

To disclose the main technical characteristics of the present invention more specifically, we provide the description of various modifications of the present invention as follows. With reference to FIGS. 1 and 3 for a first preferred embodiment of the present invention, a display casing 1 comprises a front casing 11, a rear casing 13 and a plurality of adjusting portions 15, wherein the rear casing 13 includes an accommodating space 130 disposed concavely on an internal side of the rear casing 13 for accommodating related components of a display, and a plurality of first positioning portions 131 disposed convexly on the internal side of the rear casing 13, and the first positioning portions 131 are pipe bodies having a cross-section substantially in an arc shape. In this preferred embodiment, the first positioning portions 131 are C-shaped protrusion having at least one first hook portion 1311 disposed therein, and each first hook portion 1311 is protruded from an internal surface of the first positioning portion 131. In addition, each adjusting portion 15 is composed of a support stand 151 and an elastic plate 153, and at least one second positioning portion 152 is extended separately from both lateral sides of each support stand 151, and a second hook portion 1521 is disposed at a position corresponding to the first hook portion 1311, and each second hook portion 1521 is disposed concavely on a surface of the second positioning portion 152, such that when the second positioning portion 152 is embedded to the corresponding first positioning portion 131, each hook portion 1311, 1521 can be latched to fix each support stand 151 onto the rear casing 13. In addition, each elastic plate 153 has a cross-section substantially in a curved shape, and can be fixed onto another lateral side of the support stand 151 by riveting, soldering or any other similar connecting method. If the elastic plate 153 is pressed, a deformation will result, and the farthest elastic plate 153 from the support stand 151 will shift in a direction towards the support stand 151, so that if the adjusting portions 15 are connected and fixed to the corresponding first positioning portions 131, the elastic plates 153 will form an enclosed accommodating area 133 (as shown in FIG. 2) for accommodating an LCD panel module 12 inside the accommodating area 133, and each elastic plate 153 will be abutted against edge of the LCD panel module 12 to hold the LCD panel module 12 inside the accommodating area 133. It is noteworthy to point out that manufacturers may produce LCD panel modules 12 of the same panel size but with a slight discrepancy in length or width, and the elastic plate 153 of the present invention can provide an appropriate interval change, so that the LCD panel module 12 of a same panel size produced by any manufacturer can be placed inside the accommodating area 133 due to the deformation of the elastic plate 153, and the LCD panel module 12 can be abutted by each elastic plate 153 and secure inside the rear casing 13, such that the display casing 1 of the present invention is more applicable and useful in the industry to enhance a manufacturer's market competitiveness effectively. With reference to FIGS. 1 and 3 again, the front casing 11 can be installed and engaged with the rear casing 13, and the front casing 11 includes a hole 111, and the hole 111 varies with the panel dimensions of the LCD panel module 12, so that users can view an image displayed on the display surface through the hole 111. If a manufacturer produces displays of different sizes, the manufacturer simply changes the size of the hole 111 of the front casing 11 without a need of making any change to the rear casing 13, and thus the invention can achieve the synergetic effects of providing a casing that accommodates various LCD panel modules of different sizes, improving the flexibility of assembling LCD panels significantly, reducing the inventory of spare parts, and saving manufacturing costs.

Figure 4:
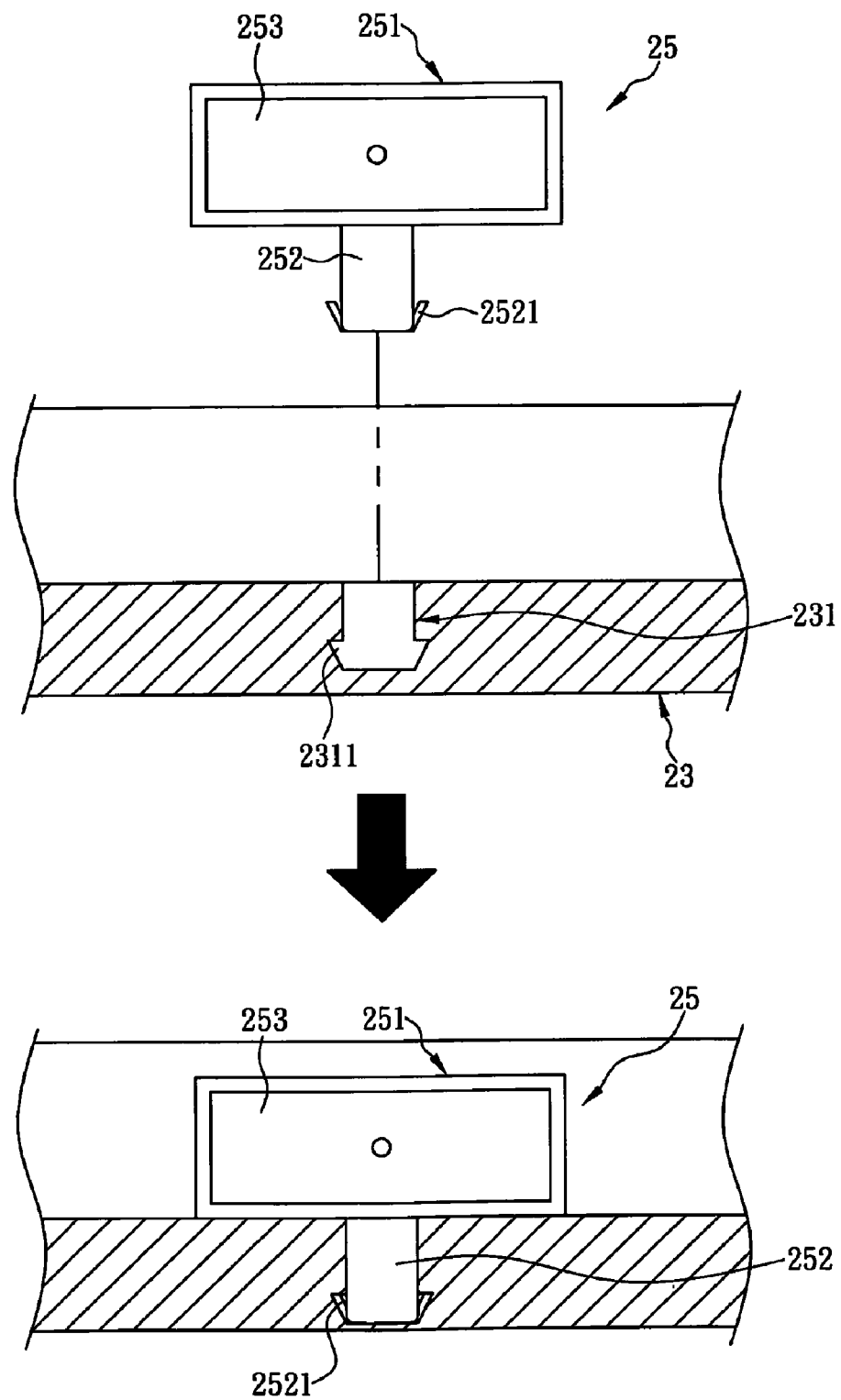
FIG. 4 is a schematic view showing a connection of an adjusting portion with a rear casing of a second preferred embodiment of the present invention.

Besides the aforementioned assembling method, persons ordinarily skilled in the art can use the technical characteristics of the present invention to make modifications to the connection between the rear casing and the adjusting portion, and the following figure simply shows a partial view of the connection between a rear casing and an adjusting portion in order to disclose different modifications more specifically. With reference to FIG. 4 for a second preferred embodiment of the present invention, a plurality of first positioning portions 231 (such as grooves) are disposed on a concave surface of the rear casing 23, and at least one first hook portion 2311 (such as a recess hole) is concavely disposed in each first positioning portion 231, and a plurality of adjusting portions 25 are provided and each is composed of a support stand 251 and an elastic plate 253, wherein the elastic plate 253 is installed on a lateral side of the support stand 251, and a second positioning portion 252 is extended downwardly from another lateral side of the support stand 251 and includes at least one second hook portion 2521 protruded from the second positioning portion 252, and the second hook portion 2521 is a plate, whose distal end can be displaced slightly. After the second positioning portion 252 is embedded into the first positioning portion 231, the second hook portion 2521 is embedded to the first hook portion 2311, such that the adjusting portion 25 can be fixed onto the rear casing 23, and manufacturers can use the adjusting portions 25 to form an enclosed accommodating area for placing an LCD panel module, and use the elastic plates 253 to abut edge of the LCD panel module to secure the LCD panel module.

Figure 5:
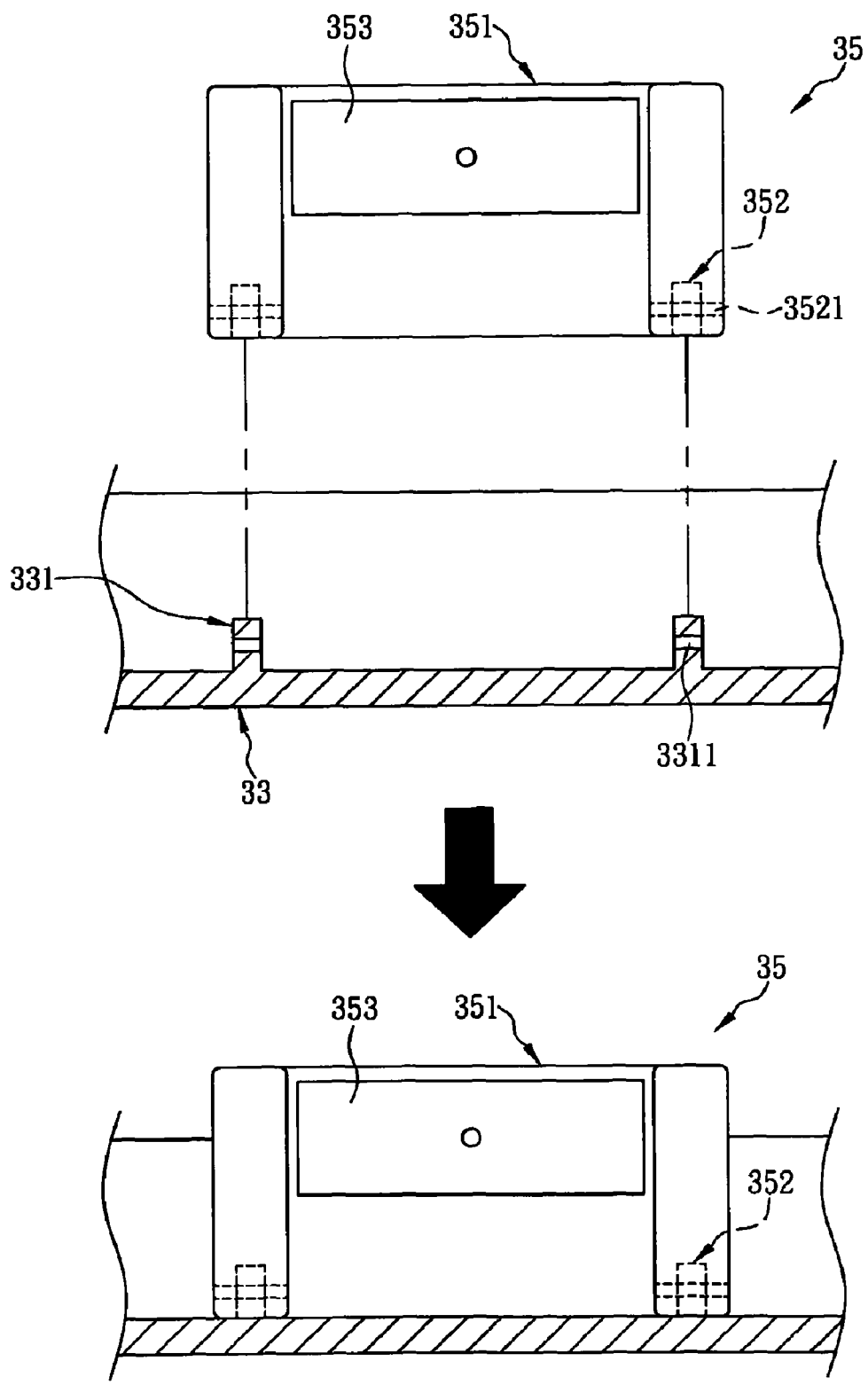
FIG. 5 is a schematic view showing a connection of an adjusting portion with a rear casing of a third preferred embodiment of the present invention.

With reference to FIG. 5 for a third preferred embodiment of the present invention, a plurality of first positioning portions 331 are protruded from an internal side of a rear casing 33, and the first positioning portion 331 of this preferred embodiment is a pillar, and a first penetrating hole 3311 is formed at a periphery of each first positioning portion 331, and a plurality of adjusting portions 35 are provided, and each includes a support stand 351 and an elastic plate 353, and at least one second positioning portion 352 is concavely disposed at the bottom at both ends of the support stand 351, and the second positioning portion 352 is a concave hole, and a second penetrating hole 3521 is disposed on the support stand 351. After the second positioning portion 352 and the first positioning portion 331 are connected, a connecting element (such as a rivet, a bolt, and the like) can be passed sequentially through the second penetrating hole 3521 and the first penetrating hole 3311 to fix the adjusting portion 35 onto the rear casing 33. In addition, the elastic plate 353 can be installed on a lateral side of the support stand 351, such that manufacturers can change positions of the adjusting portions 35 to form an enclosed accommodating area of a specific size. When an LCD panel module is contained in the accommodating area, the elastic plates 353 abut against an edge of the LCD panel module to achieve a secured connection. In summation of the description above, the rear casing and the adjusting portion of the present invention fit displays of different specifications, and thus manufacturers can produce display devices of different sizes simply by producing the front casings with additional holes of different sizes in order to mass produce the rear casings and the adjusting portions with the same specification, so as to reduce the manufacturer's inventory and enhance the utilization of display casings significantly. Manufactures may produce the display casings with variable holes at the front casing during the manufacture of the display devices of different specifications, but the overall volume of the front casing and the rear casing remains the same. Therefore, manufacturers need not to adjust the machine parameter or the robot arm control for the production lines, regardless of the display devices of different specifications, so as to achieve the effects of reducing the complexity of production management, avoiding a delay of production schedule, and lowering the production cost.

It is noteworthy to point out that the manufacturers can modify the shape and the structure of the positioning portions in other preferred embodiments of the present invention. For example, the first positioning portion 231 and the second positioning portion 252 as shown in FIG. 4 may come with no hook portion, but adopt a penetrating hole instead, such that the penetrating hole together with the connecting element can be used for the connection, or the first positioning portion 331 and the second positioning portion 352 as shown in FIG. 5 may have no penetrating hole, but adopt a hook portion for the connection instead.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display casing capable of accommodating LCD panel modules of different sizes, comprising:
   a rear casing including a plurality of first positioning portions disposed on an internal side of the rear casing, wherein the first positioning portion is a protrusion body erected on the rear casing and includes at least one first hook portion disposed in the protrusion body;
   a plurality of adjusting portions each including a support stand and an elastic plate, wherein at least one second positioning portion is disposed at a distal side of the support stand and coupled with the first positioning portion, such that the support stand is fixed onto the rear casing, and the elastic plate is fixed onto a lateral side of the support stand; the second positioning portion includes a second hook portion disposed at a position corresponding to the first hook portion, such that when the second positioning portion is embedded into the first positioning portion, the first hook portion and the second hook portion are coupled and fixed together; and when the second positioning portions of the adjusting portions are connected to the corresponding first positioning portions, the elastic plates of the adjusting portions form an enclosed accommodating area for accommodating an LCD panel module inside the accommodating area, and the elastic plate abuts against edge of the LCD panel module for positioning the LCD panel module in the accommodating area; and
   a front casing engaged with the rear casing and having a hole disposed at the center of the front casing, for displaying an image on a display surface of the LCD panel module.

2. A display casing capable of accommodating LCD panel modules of different sizes, comprising:

a rear casing including a plurality of first positioning portions disposed on an internal side of the rear casing, wherein the first positioning portion is a groove disposed concavely on the rear casing and includes at least one first hook portion disposed in the groove;

a plurality of adjusting portions each including a support stand and an elastic plate, wherein at least one second positioning portion is disposed at a distal side of the support stand and coupled with the first positioning portion, such that the support stand is fixed onto the rear casing, and the elastic plate is fixed onto a lateral side of the support stand; the second positioning portion includes a second hook portion disposed at a position corresponding to the first hook portion, and the second hook portion is a plate, such that when the second positioning portion is embedded into the first positioning portion, the first hook portion is coupled and fixed with the second hook portion; and when the second positioning portions of the adjusting portions are connected to the corresponding first positioning portions, the elastic plates of the adjusting portions form an enclosed accommodating area for accommodating an LCD panel module inside the accommodating area, and the elastic plate abuts against edge of the LCD panel module for positioning the LCD panel module in the accommodating area; and a front casing engaged with the rear casing and having a hole disposed at the center of the front casing, for displaying an image on a display surface of the LCD panel module.

* * * * *